United States Patent [19]
Flindt

[11] 3,713,668
[45] Jan. 30, 1973

[54] PROTECTIVE DEVICE FOR TRAILERS AND LIKE VEHICLES

[75] Inventor: Walter E. Flindt, Warminster, Pa.

[73] Assignees: Walter E. Flindt, Warminster, Bucks County; William V. Hostelley, Jr., Abington, Montgomery County, Pa.

[22] Filed: Nov. 15, 1971

[21] Appl. No.: 198,616

[52] U.S. Cl. ............................... 280/150 R, 70/227
[51] Int. Cl. ............................................. B60r 27/00
[58] Field of Search..... 280/150 R; 70/226, 260, 227, 70/15, 18, 30; 301/9 DN; 180/114

[56] References Cited

UNITED STATES PATENTS

| 1,464,262 | 8/1923 | Fish | 70/227 |
| 1,502,809 | 7/1924 | Connors | 70/18 |
| 1,467,353 | 9/1923 | Childress | 70/226 |
| 1,804,678 | 5/1931 | Duffy | 70/260 |
| 1,098,982 | 6/1914 | Seeber | 70/15 |

*Primary Examiner*—Kenneth H. Betts
*Assistant Examiner*—Robert R. Song
*Attorney*—Henry N. Paul, Jr. et al.

[57] ABSTRACT

A protective device for preventing theft of vehicles, and particularly trailer-type vehicles, having an eye bolt adapted to be screwed in threaded engagement with a wheel member of the vehicle, a linking member which is looped through the eye of the eye bolt and around an accessible structural member of the vehicle, and a coupling element such as a lock for securing the linking member in a closed loop. The linking member is secured in the loop with sufficiently little slack that the eye bolt cannot be unthreaded from its engagement with the wheel, and so that the wheel can be rotated no more than a fraction of a revolution before being restrained from further rotation by the linking member.

9 Claims, 4 Drawing Figures

PATENTED JAN 30 1973 3,713,668
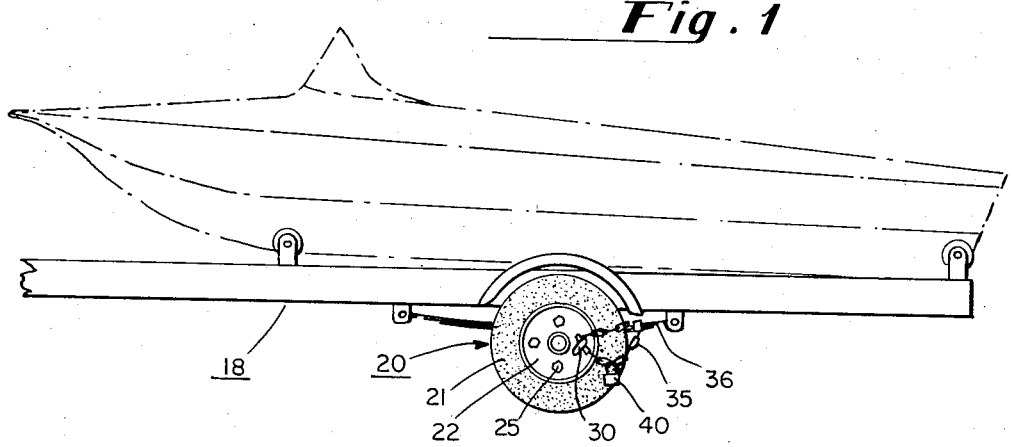
Fig. 1
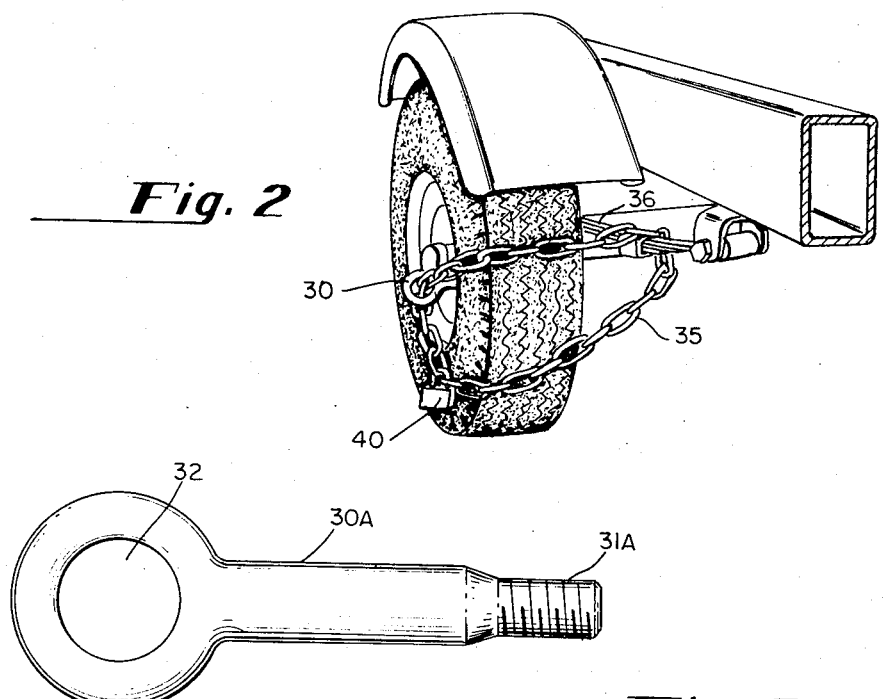
Fig. 2
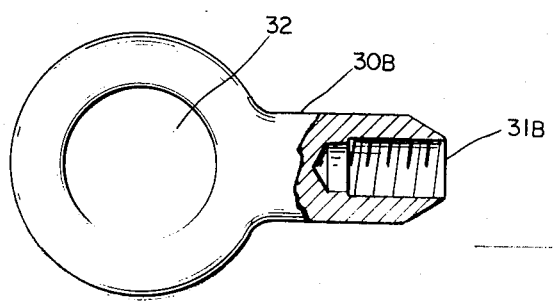
Fig. 3A
Fig. 3B

PROTECTIVE DEVICE FOR TRAILERS AND LIKE VEHICLES

BACKGROUND OF THE INVENTION

1. Field of the Invention

This invention lies in the field of protective devices for vehicles and, more particularly, protective devices for preventing theft of trailer-type vehicles, by rendering at least one wheel thereof unable to rotate.

2. Description of the Prior Art

There has been a dramatic increase in recent years in the use of non-motorized vehicles such as campers and trailers which are pulled by automobiles. As is well known, the use of campers, two wheel and greater, has risen sharply, as the American population has become more mobile and has sought increased variety in its leisure time activities. As another example, there has been a great increase in the number of privately owned boats which are of sizes in the range such that they can be hauled around on trailers. Such boat trailers are typically two and four wheeled non-motorized vehicles, which are coupled to the back of an automobile and hauled therefrom. Other types of trailers include the peripatetic rental trailer, horse trailers, and the like.

All of the above types of vehicles have a common feature in that they may be easily removed from the motorized vehicle by which they are being pulled, hitched to another motorized vehicle, and transported away. In other words, they can be stolen. Not only can they be stolen, but they are being stolen in increasing numbers, and such property thefts have become a mounting national problem.

The prior art has provided a wide number and variety of devices for preventing such thefts. However, such devices generally are expensive, difficult and time consuming to install, and relatively ineffective in operation. For example, one commonly used method for preventing theft of a two wheel trailer is that of placing a bar through openings in each wheel, which openings have been specifically placed to receive such a bar. After placement of the bar, a bicycle-type lock is attached to the vehicle, coupling the bar and at least one of the wheels in a manner so as to prevent rotation of the wheel. However, a serious disadvantage of this apparatus is that the receiving openings in each of the wheels inevitably are unaligned, such that one of the wheels has to be rotated with respect to the other to bring the openings into alignment before the bar can be placed therethrough. Further, it is obvious that the bar must be withdrawn when it is desired to move the trailer, and in fact the entire apparatus must be dismantled and carried separately.

Both in terms of the amount of property theft and in terms of the expense and relative inefficiency of the devices presently available to the public, there exists a great need for a simple, easily installed protective device which is highly effective in preventing the theft of trailers and like vehicles.

SUMMARY OF THE INVENTION

It is a primary object of this invention to provide an inexpensive device which may be easily and quickly installed on a vehicle and will act to prevent the theft of such vehicle, and which will in no way require change or modification in any respect of the vehicle in order to adapt it for installation of such device.

It is a further object of this invention to provide a protective device for use on vehicles wherein part of the device is adapted to be permanently installed on the vehicle, and the installation of the device as an operative theft-protective device can be accomplished extremely easily and rapidly and without further modification of the vehicle.

In accordance with the above objectives, there is provided an eye bolt adapted to be threadedly engaged with a wheel, or mount for such wheel, of a vehicle, the eye bolt being so engaged at least more than several turns, a linking member such as a chain which is looped through the eye of said bolt and around a structural member of the vehicle, the chain being fastened in a closed loop by a lock or other coupling element. When fastened in a closed loop, the linking member secures the eye bolt in connection with the vehicle structural member, and has sufficiently little slack that the eye bolt cannot be untwisted as much as said at least several turns, so that the linking member is secured against unwanted removal. In addition, the linking member when fastened in a closed loop has sufficiently little slack that the wheel to which it is linked cannot be turned any substantial difference without being restrained by the linking member.

BRIEF DESCRIPTION OF THE DRAWINGS

FIG. 1 is an elevation view of the apparatus of this invention as applied to a wheel of a boat trailer with a boat shown in phantom on the trailer.

FIG. 2 is a perspective view of a trailer wheel and a portion of the structure of a trailer, with the apparatus of this invention installed thereon so as to prevent unwanted movement of the vehicle.

FIGS. 3A and 3B present views of two eye bolts adaptable for use in this invention. FIG. 3A is a plan view of an eye bolt with an externally threaded male end portion; FIG. 3B is a plan view, partially broken away, of an eye bolt adapted for use in this invention, having a female, or internally threaded opening for threaded engagement with an externally threaded stud connected to the wheel drum.

DESCRIPTION OF THE PREFERRED EMBODIMENTS

Referring now to FIGS. 1 and 2, the apparatus of this invention is shown as applied to a trailer-type vehicle 18. The vehicle 18 illustrated carries a boat, and is suitably coupled (hitched) to an automobile or other motor-powered vehicle by conventional coupling means not shown. The manner of hauling the vehicle and the load that it is designed to carry do not, of course, comprise part of the invention as claimed herein. It is to be particularly noted that whereas the invention is described in the specification as being applied to a non-motorized vehicle, such as a trailer, that it is more general in application and is in no way limited to non-motorized vehicles. It can equally be applied to a motorized vehicle, as will be readily apparent to the reader. Consequently, as used henceforth in this application, the term vehicle is not limited by the type of load it is designed to carry, the means of pulling or propelling the vehicle, the number of wheels or axles it contains, or any other such characteristic. The preferred embodiment of the invention is illustrated as being applied to trailer-type vehicles which are carried by passenger automobiles, because this is the area where the device currently finds its greatest application.

The term wheel, as indicated generally by the numeral 20, is defined herein to embrace the entire mechanism at each end of the axle. Thus, the wheel generally would embrace the tire, the hub on which the tire is mounted, the drum on which the hub and tire in turn are mounted, and/or the plate or any equivalent structure behind the drum. The wheel may, as is the case with a great many passenger cars and trailers, have laterally extending external threaded studs, or bolts, which provide support for attaching the tire and hub to the wheel drum. Such bolts are suitably integrally connected to the wheel drum, and in practice the hub has openings 25 radially placed at equal distances from the center axle, and adapted of a size to receive the hub studs. When the tire 21 and hub 22 are thus placed upon the studs, tire and hub are secured to the drum by screwing nuts onto the studs with sufficient tightness to hold the tire in place. In the practice of this invention, one of such nuts may be removed, leaving an exposed externally threaded stud, onto which is screwed an eye bolt as shown at 30. The eye bolt is adapted with a receiving opening 31B (see FIG. 3B) which is internally threaded, so that the eye bolt is threaded over and onto the stud. Thus, just one nut is removed, and replaced with the eye bolt 30. A linking member 35, such as the chain illustrated in the drawings, is looped through the eye 32 of the bolt, and also wrapped around a structural member 36 of the vehicle. For many trailers commonly in use, structural member 36 may be a leaf spring which connects the chassis with the trailer carriage. It is, of course, noted that the linking member may be looped around any other well secured structural member on the vehicle which is of sufficient strength to be used for the purpose of restraining movement of the wheel. The chain, thus looped through the eye 32 of bolt 30 and around vehicle structure member 36, is then coupled at its free ends by a lock or equivalent coupling element 40. Some slack may be left in the loop, but the loop is fastened with sufficiently little slack to prevent any substantial movement of eye bolt 30 with respect to structure 36, as is set forth in more detail hereinbelow. The degree of slack in the loop may, of course, be adjusted by adjusting the length of the uncoupled linking member 35. It is further to be noted that coupling element 40 may be a separate element, such as a lock, or it may be an integral portion of the member 35, as where member 35 may have engageable pieces at its ends which may be locked and unlocked.

As has been noted hereinabove, the vehicle shown generally at 18 may have a wheel adapted with externally threaded studs, or internally threaded openings to receive threaded bolts. The invention of this application is easily and efficiently adapted for either of these configurations. For example, in the event the wheel, or more particularly the wheel hub, contains internally threaded female-type openings, the externally threaded eye bolt 30A, having threaded portion 31A as shown in FIG. 3A, is employed. Conversely, where the wheel, or more particularly the wheel hub, is adapted with extending externally threaded studs, the eye bolt 30B contains an internally threaded female opening 31B, such that bolt 30B is adapted to be threaded onto the stud.

The length of eye bolt 30, defined as being between the threaded portion 31 and the eye portion 32, may be of any desired length. Since the eye bolt may be left attached to the wheel for an indefinite period, it is generally desirable to minimize the length of the eye bolt, and in practice this length can be reduced to the point where there is substantially no shaft portion between the threaded end and the eye portion of the bolt.

It is seen from the above that the components of the apparatus of this invention are readily available, relatively inexpensive, easy to install, and interchangeable from vehicle to vehicle. To use the invention, the user simply threads on an eye bolt, loops a chain through the eye and around a trailer member, and secures the ends of the chain. The wheel stud (or receiving opening) for trailer type vehicles and automobiles generally has a thread size within ¼ inch to 1 inch in diameter, and of varying lengths. For example, a ½ - 20 size is widely found. Thus, only a limited member of standard size eye bolts need be available in order for virtually any user to adapt the invention to his vehicle. This feature, of course, contributes to the relative economy of the apparatus. Further, if a user has already applied the apparatus to a given vehicle, and desires to apply it to another vehicle, at most only a different eye bolt would be needed, and in most instances even the eye bolt would be interchangeable from one vehicle to the other.

In order to maximize the security provided by the invention, it is desirable to produce the component parts with as high a degree of hardness as is economically feasible. The bolt 30 is suitably manufactured of a hardened steel, Rockwell hardness 45 to 50. Similarly, the member 35 and the coupling element 40 are produced of alloyed steel, or harder material, which cannot be cut with ordinary shears.

It is to be noted that, while an eye bolt has been used in illustrating the preferred embodiments, any other type of threaded member which can be screwed onto the wheel, and which has a receiving opening, may be used in this invention. Also, the linking member may be any suitable element which can be pulled around in a loop and secured tightly enough so that the wheel can't be moved an appreciable distance, and the threaded member can't be unthreaded from the wheel.

I claim:

1. A protective device for preventing theft of a vehicle by constraining movement of one wheel thereof, said vehicle having a secure structural member adjacent said one wheel, comprising:
   a. a threaded member having a threaded portion and a receiving opening, in threaded engagement with said wheel;
   b. a linking member, in linking engagement through said opening and with said structural member; and
   c. a coupling element, holding said linking member in a closed loop so as to prevent any substantial rotation of said wheel, said coupling element securing said linking member at respective portions thereof to adapt the length of said loop so that said linking member has sufficiently little slack that said threaded member cannot be taken out of threaded engagement with said wheel.

2. The device as described in claim 1, wherein said threaded member is an eye bolt.

3. The device as described in claim 2, wherein said threaded portion of said eye bolt has external threads, and is of a thread size to be threadedly received in said wheel.

4. The device as described in claim 2, wherein said threaded portion of said eye bolt has internal threads, and is of a thread size to threadedly engage said wheel.

5. The device as described in claim 1 wherein said linking member is a chain, and said coupling member is a lock, said lock holding said chain in a tightly closed loop.

6. The device as described in claim 2, wherein said eye bolt is adapted to be permanently installed on said wheel.

7. The device as described in claim 2, wherein said eye bolt is engaged in said wheel through at least several revolutions.

8. A method of securing a theft prevention device to a vehicle, said vehicle having at least one wheel and an adjacent structural member, comprising:
   a. threading an eye bolt into said wheel by turning same at least several turns;
   b. looping a chain through said eye bolt and around said structural member; and
   c. securing said chain into a tightly closed loop, whereby said wheel is constrained from rotation by said chain and said eye bolt, and said eye bolt cannot be unthreaded from said wheel.

9. The method as described in claim 8, comprising releasing and removing said chain, and leaving said eye bolt in threaded engagement with said wheel when said chain is not secured in said loop and said vehicle is moving.

* * * * *